Dec. 24, 1940.　　　C. W. HEDSTROM　　　2,226,098
CHILD'S VEHICLE
Filed April 2, 1940

Inventor.
Carl W. Hedstrom
atty

Patented Dec. 24, 1940

2,226,098

UNITED STATES PATENT OFFICE 2,226,098

CHILD'S VEHICLE

Carl W. Hedstrom, Gardner, Mass., assignor to Hedstrom-Union Company, Gardner, Mass., a corporation of Massachusetts Application April 2, 1940, Serial No. 327,398

5 Claims. (Cl. 301—111)

The present invention relates to improvements in wheels for children's vehicles such as velocipedes, doll and baby carriages, and the like, and more particularly to a construction for locking the wheel to its axle.

Velocipedes, doll and baby carriages, carts and other children's vehicles are ordinarily shipped with the wheels off the axles to reduce packaging and transportation costs. Thus the purchaser must place the wheels on and lock them against detachment from the axles. This involves some time and mechanical skill. The usual locking means is a cotter pin passed through a hole in the end part of the axle. A wheel for a vehicle of this type is ordinarily supplied with a hub cap which is designed to cover the end of the axle and to conceal the cotter pin or other locking member. The hub cap is secured to the wheel after the cotter pin or other lock is in place by bending tongues of the cap about parts of the wheel. It is evident, therefore, that considerable time is consumed in assembling the wheels on the vehicle.

One object of the present invention, accordingly, is to provide a wheel and locking device therefor by which the above mentioned difficulties may be obviated. To this end, the parts of the wheel including the hub cap are assembled as a unit by the manufacturer and the hub of the wheel is provided with a peripheral slot for receiving one lag of a spring clip which is also arranged to enter a peripheral groove in the axle on which it is mounted. Another object of the present invention is the provision of a wheel lock arranged to engage the outer part of the axle and so constructed that the wheel and its hub cap can be permanently united at the factory.

A further object of the invention is the provision of a wheel lock so arranged that the act of placing the wheel on the axle automatically locks the wheel against detachment from the axle.

A yet further object of the invention is the provision of a wheel lock which resiliently grips the wheel hub and has a part maintained releasably engaged with the axle.

An additional object of the invention is the provision of a wheel lock carried by the wheel in locking relation with the axle and arranged to be cammed out of such locking relation.

Another object of the invention is the provision of a wheel having a large spoke disc and a locking device carried by the wheel hub near the large disc where it is substantially concealed by said disc.

Another object of the invention is generally to improve the construction and operation of children's vehicles of the type set forth.

With the above and other objects and features in view, the invention will now be described with reference to the accompanying drawing which illustrates a preferred embodiment of the invention and in which.

Figure 1:
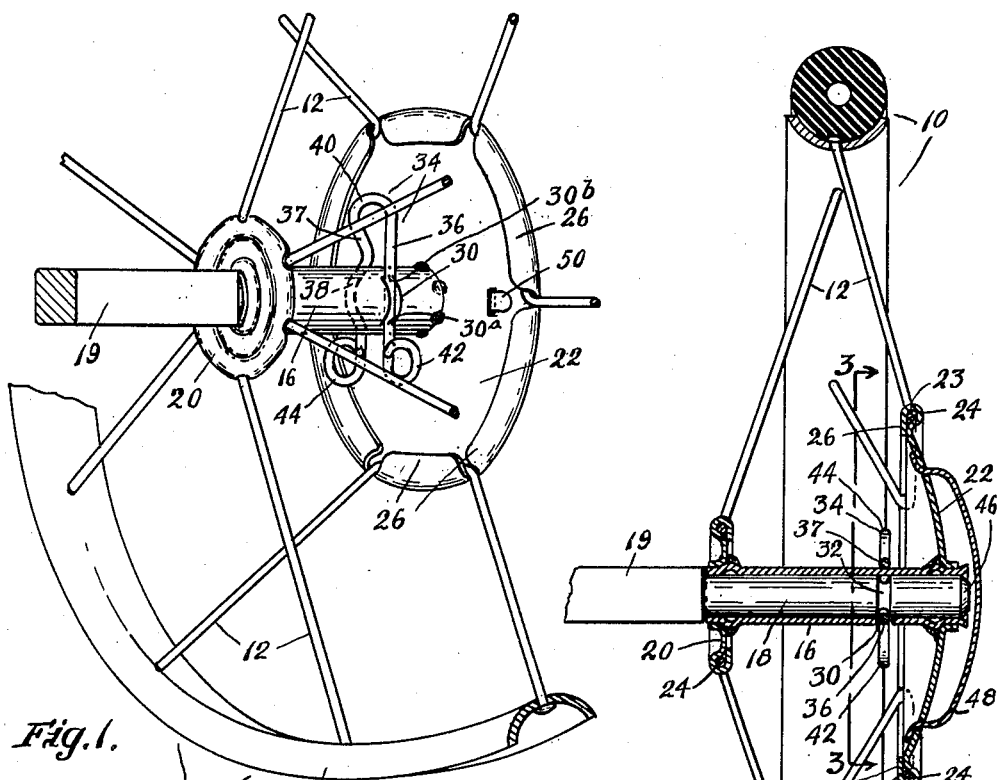
Fig. 1 is a perspective view illustrating one embodiment of the present invention.
Figure 2:
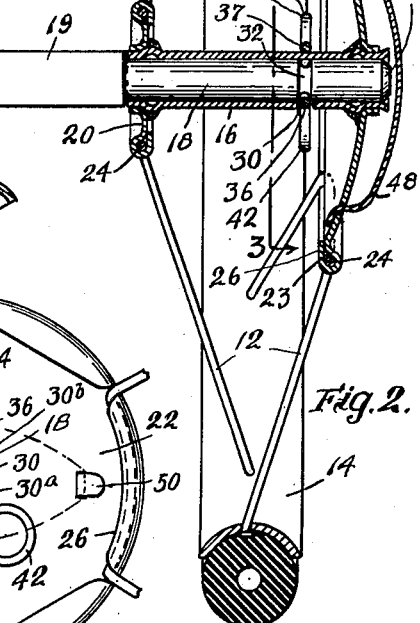
Fig. 2 is a view in cross-section taken along the axis of rotation of the wheel.

As illustrated in Fig. 1, the wheel 10 is provided with spokes 12, a rim 14, and a hub 16 formed of a metal sheet wrapped into cylindrical tubular form. Hub members or spoke discs 20 and 22 are pressed upon the end parts of the hub, the outer disc 22 being herein illustrated as larger in diameter than the inner disc. Each of the discs near its periphery is provided with an annular spoke-supporting shoulder or ledge 23 upon which the intermediate connecting member 24 of a pair of adjacent spokes is seated. The spokes are fixed to the discs and held in the aforesaid relation by peripheral lips 26 which are inturned over the intermediate spoke members 24, thereby clamping them to the disc.

The hub 16 adjacent to the outer spoke disc 22 is provided with a transverse slot 30 which is open to the interior of the hub and overlies and registers with an annular peripheral parallel-sided groove 32 formed in the wheel-journal part 18 of the axle 19 when the wheel is in its designed location on the axle. The length of the hub slot 30 is such that a straight line tangent with the bottom end walls of the slot lies approximately in the bottom part of the axle groove 30 but clears the bottom wall of the groove.

The locking device for the wheel comprises a spring clip or cotter 34 formed of round spring wire and having a general U-shape and provided with a straight leg 36 and, spaced therefrom, a second leg 37 having an arcuate portion 38 intermediate its ends. The straight leg is adapted to enter the slot 30 of the hub and lie in the groove 32 of the axle where it confronts the two opposite side walls of the groove and hence prevents unintentional axial displacement of the wheel on the axle. The groove 32 is sufficiently wider than the width of the leg 36 so that the leg does not offer any material resistance to wheel rotation. The arcuate portion 38 of the other leg 37 embraces the peripheral part of the hub opposite the slot. The two legs are connected by an intermediate resilient connecting part 40 which, when the device is on the hub as above described, press the two legs inwardly with substantial pressure so that the legs grip the hub and resist displacement from locking position. The free end parts of the legs are curved outwardly away from each other into substantially ring shape as illustrated at 42, 44 by which the clip can be forced in the direction of its legs over the wheel hub to seat the hub into the curved part of the curved leg and the straight leg into the hub slot.

The wheel is adapted to be shipped with the straight leg of the locking device in the hub slot. The end of the axle is chamfered off to provide a conical sloping or cam surface 46 which at its smallest diameter is approximately equal to the diameter of the bottom of the axle groove 32. Thus the wheel can be assembled and automatically locked on its axle by moving the wheel smartly into position on the axle, the cam surface 46 springing the straight leg of the locking device outwardly to the periphery of the shaft, and the leg dropping by the inherent resiliency of the device into the axle groove when the groove and leg become aligned.

Figure 3:
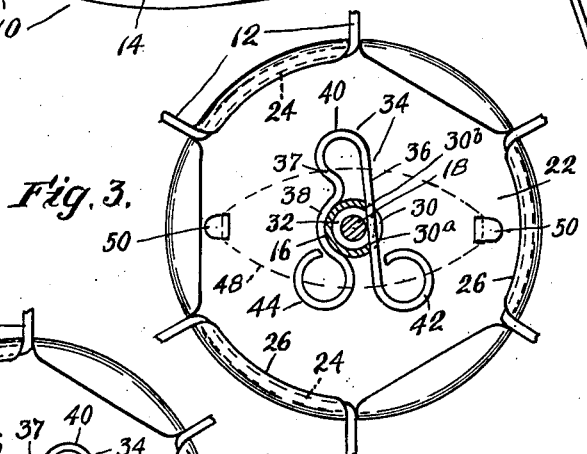
Fig. 3 is a detailed view in cross-section taken along the line 3—3 of Fig. 2 illustrating the locking device in operative position.
Figure 4:
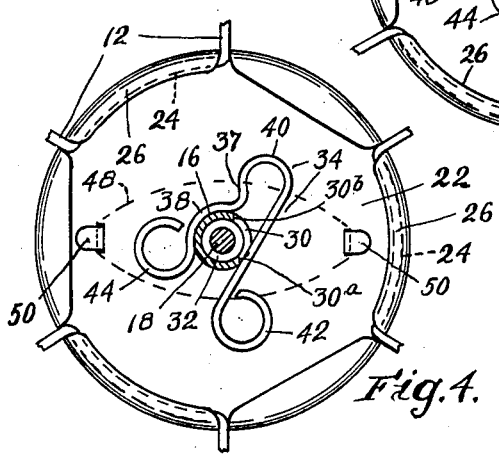
Fig. 4 is a view similar to Fig. 3 but illustrating the locking means in inoperative or unlocked position.

If it is desired to remove the wheel from the axle the lock can be released by turning the locking device on the hub in either direction, thereby forcing the straight leg 36 out of the hub slot by the camming action between the leg and an end wall 30a or 30b of the slot as illustrated in Fig. 4. This operation is conveniently and readily accomplished without the use of tools and the clip may be returned to its operative position, that is, the position shown in Fig. 3, by rotating the clip 34 in a counter-clockwise direction.

The locking device is adjacent the large outer spoke disc 22 so that it is concealed by the disc.

The device is so arranged that spring pressure of the clip 34 is not transmitted to the axle 18, since the slot 30 is so arranged relatively to the groove 32 that the straight leg 36 of the clip 34 is supported by the hub 16 in such a manner that the straight portion 36 of the clip 34 does not engage the bottom of the groove 32.

The outer spoke disc is provided on its outer face with a name plate or escutcheon 48, herein elliptical in outline as illustrated in dotted lines Fig. 3, which overlies and conceals the outer end of the hub and axle, the escutcheon being permanently affixed to the wheel by ears 50 which pass through the outer spoke disc and overlie the inner face thereof.

Having thus described my invention, what I claim as new and desire to secure by Letters Patent of the United States is:

1. In a vehicle, an axle having a peripheral groove, a wheel hub having a slot opening into said groove, and a spring locking device consisting of two spaced confronting legs having resilient connecting means that urge the legs inwardly toward each other, said legs being on opposite sides of the hub and one leg being extended through said slot and groove and the other leg bearing on said hub on the side opposite the slot.

2. In a vehicle, an axle having a tapered end part and a peripheral groove back of said end part, a wheel hub on said axle having a circumferentially extended slot opening into said groove, and a locking member having a pair of resiliently connected confronting arms, one extended through said slot and groove and the other bearing on said hub on the side opposite said slot.

3. In a vehicle, an axle having a peripheral groove, a wheel hub having a peripherally elongated slot overlying and opening into said groove, and a locking member having a leg passed through said slot and said groove to lock said hub and axle against relative axial movement, said leg being seated on the ends of said slot clear of the bottom of said groove and a second leg opposed to and resiliently connected with said first leg exerting pressure on the hub in a direction to maintain said first leg resiliently and removably in the aforesaid relation.

4. In a vehicle, an axle having a peripheral groove, a wheel hub having a slot overlying and opening into said groove, and a resilient locking member having a leg provided with a curved portion embracing the periphery of the hub, a straight leg confronting said first leg and extended through said groove and slot to lock the hub and axle against relative axial movement, and a reflexed portion connecting said legs and spring urging said legs toward each other and against the hub.

5. A wheel locking device comprising a spring cotter composed of a spring strip reflected into general U-shape and having a generally straight leg and a second leg spaced from and generally parallel with the first leg and provided with an intermediate arcuate wheel-hub-engaging section that confronts the straight legs, the legs having outwardly curved end parts.

CARL W. HEDSTROM.